US011221853B2

(12) United States Patent
Lee et al.

(10) Patent No.: US 11,221,853 B2
(45) Date of Patent: Jan. 11, 2022

(54) METHOD OF DISPATCHING INSTRUCTION DATA WHEN A NUMBER OF AVAILABLE RESOURCE CREDITS MEETS A RESOURCE REQUIREMENT

(71) Applicant: Huawei Technologies Co., Ltd., Shenzhen (CN)

(72) Inventors: Chang Hoon Lee, Montreal (CA); Louis-Philippe Hamelin, Montreal (CA); Peter Man-Kin Sinn, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 399 days.

(21) Appl. No.: 14/952,241

(22) Filed: Nov. 25, 2015

(65) Prior Publication Data
US 2017/0060592 A1  Mar. 2, 2017

Related U.S. Application Data

(60) Provisional application No. 62/210,114, filed on Aug. 26, 2015.

(51) Int. Cl.
*G06F 9/38* (2018.01)

(52) U.S. Cl.
CPC .......... *G06F 9/3836* (2013.01); *G06F 9/3838* (2013.01)

(58) Field of Classification Search
CPC ........ G06F 9/3836; G06F 9/50; G06F 9/5016; G06F 9/5061; G06F 9/5077; G06F 9/3838
See application file for complete search history.

(56) References Cited

U.S. PATENT DOCUMENTS

| 5,073,855 A | 12/1991 | Staplin et al. |
| 8,176,298 B2 * | 5/2012 | Hass ................ H04L 49/00 712/10 |
| 8,397,236 B2 * | 3/2013 | Gibson .............. G06F 9/4881 718/100 |
| 9,491,112 B1 * | 11/2016 | Patel ................ H04L 47/70 |

(Continued)

FOREIGN PATENT DOCUMENTS

| CN | 101606130 A | 12/2009 |
| CN | 104823129 A | 8/2015 |

OTHER PUBLICATIONS

SIPO of the P.R China; International Search Report and Written Opinion issued in corresponding International Application No. PCT/CN2016/075997, dated Jun. 14, 2016, 12 pages.

(Continued)

*Primary Examiner* — David J. Huisman
(74) *Attorney, Agent, or Firm* — Slater Matsil, LLP (57) ABSTRACT

The processor chip can have a pre-execution pipeline sharing a plurality of resources including at least one resource of interest, a resource tracker having more than one credit unit associated with each one of said at least one resource of interest. The method can include: decoding the instruction data to determine a resource requirement including a quantity of virtual credits required from the credit units for the at least one resource of interest, checking the resource tracker for an availability of said quantity of virtual credits and, if the availability of the amount of said virtual credits is established, i) dispatching the instruction data, and ii) subtracting the quantity of said credits from the resource tracker.

19 Claims, 10 Drawing Sheets

(56) References Cited

U.S. PATENT DOCUMENTS

| | | | |
|---|---|---|---|
| 9,635,103 B2* | 4/2017 | Earl | H04L 67/1031 |
| 9,692,707 B2* | 6/2017 | Tang | H04L 47/70 |
| 2003/0135449 A1* | 7/2003 | Xu | H04L 47/623 |
| | | | 705/38 |
| 2004/0158636 A1* | 8/2004 | Nakagawa | G06F 9/5016 |
| | | | 709/226 |
| 2004/0158694 A1 | 8/2004 | Tomazin et al. | |
| 2007/0198982 A1* | 8/2007 | Bolan | G06F 9/5038 |
| | | | 718/104 |
| 2007/0198983 A1* | 8/2007 | Favor | G06F 9/5061 |
| | | | 718/104 |
| 2008/0189522 A1 | 8/2008 | Meil et al. | |
| 2013/0061233 A1* | 3/2013 | Zhou | G06F 9/4881 |
| | | | 718/103 |
| 2013/0339968 A1* | 12/2013 | Boland | G06F 9/4881 |
| | | | 718/103 |
| 2014/0129805 A1 | 5/2014 | Husby | |
| 2014/0143523 A1 | 5/2014 | Chadha et al. | |
| 2014/0189377 A1 | 7/2014 | Subbareddy et al. | |
| 2014/0310504 A1 | 10/2014 | Kadgi et al. | |
| 2014/0380324 A1* | 12/2014 | Xiao | G06F 9/5083 |
| | | | 718/102 |
| 2015/0161401 A1 | 6/2015 | Na et al. | |
| 2015/0222564 A1* | 8/2015 | Wheeler | H04L 47/70 |
| | | | 709/226 |
| 2015/0378753 A1* | 12/2015 | Phillips | G06F 9/455 |
| | | | 718/1 |

OTHER PUBLICATIONS

Nabil Imam et al. Address-Event Communication Using Token-RingMutual Exclusion, 17th IEEE International Symposium on Asynchronous Circuits and Systems, 2011. pp. 99-108.

"Working with Combinational Logic", CSE370—VIII—Time Behavior, 13 Pages, Winter 2010.

* cited by examiner

CREDIT DETECTOR

CREDIT DETECTOR TRUTH TABLE

| INPUT | | | | OUTPUT | | | |
|---|---|---|---|---|---|---|---|
| CREDIT UNIT #0 CREDIT AVAILABLE | CREDIT UNIT #1 CREDIT AVAILABLE | CREDIT UNIT #2 CREDIT AVAILABLE | CREDIT UNIT #3 CREDIT AVAILABLE | 1-AVAILABLE | 2-AVAILABLE | 3-AVAILABLE | 4-AVAILABLE |
| 0 | 0 | 0 | 0 | 0 | 0 | 0 | 0 |
| 0 | 0 | 0 | 1 | 1 | 0 | 0 | 0 |
| 0 | 0 | 1 | 0 | 1 | 0 | 0 | 0 |
| 0 | 1 | 0 | 0 | 1 | 0 | 0 | 0 |
| 1 | 0 | 0 | 0 | 1 | 0 | 0 | 0 |
| 0 | 0 | 1 | 1 | 1 | 1 | 0 | 0 |
| 0 | 1 | 0 | 1 | 1 | 1 | 0 | 0 |
| 0 | 1 | 1 | 0 | 1 | 1 | 0 | 0 |
| 1 | 0 | 0 | 1 | 1 | 1 | 0 | 0 |
| 1 | 0 | 1 | 0 | 1 | 1 | 0 | 0 |
| 1 | 1 | 0 | 0 | 1 | 1 | 0 | 0 |
| 0 | 1 | 1 | 1 | 1 | 1 | 1 | 0 |
| 1 | 0 | 1 | 1 | 1 | 1 | 1 | 0 |
| 1 | 1 | 0 | 1 | 1 | 1 | 1 | 0 |
| 1 | 1 | 1 | 0 | 1 | 1 | 1 | 0 |
| 1 | 1 | 1 | 1 | 1 | 1 | 1 | 1 |

FIG. 12

METHOD OF DISPATCHING INSTRUCTION DATA WHEN A NUMBER OF AVAILABLE RESOURCE CREDITS MEETS A RESOURCE REQUIREMENT

CROSS-REFERENCE TO RELATED APPLICATIONS

This application claims priority of U.S. provisional application 62/210,114 filed Aug. 26, 2015, the contents of which are hereby incorporated by reference.

FIELD

These improvements generally relate to the field of processors and more specifically to a method of managing the attribution of instructions to one or more resources for which the associated instruction data is queued prior to use of the one or more resources.

BACKGROUND

Processors have been provided in the form of electronic chips for decades. During that time, processors have evolved in various ways. Advancements in processor design include: making the processor smaller to increase the speed at which the operations are executed; increasing the number of execution units in a processor to allow execution of multiple instructions in parallel; and developing control units/resource management in order to maximize the utilization of available execution units. As the number of execution units on the chip has increased, so has the size and complexity of the resource management-related features. This added complexity has introduced new challenges to the efficient operation of processors.

Most processors today are 'synchronous' processors in that they typically make use of a common clock to govern control and execution functions. Synchronous control allows for conceptually simpler management of the parallel execution of multiple instructions. Further, since more instructions executed in a given time period often leads to increased processor throughput, there is a strong motivation to increase the speed of the clock to increase performance. However, the speed of the processor's clock is limited by the speed of the slowest one of its functions.

As an alternate design, an asynchronous processor reacts to 'events' rather than waiting for a reference clock. For instance, a signal indicating that a given transaction (e.g., a decoded instruction being dispatched) has been completed can immediately trigger the execution of another transaction. If the 'event' results from a transaction which has a shorter execution time than a cycle of a reference clock, a faster execution time can be achieved.

Although various forms of control have been developed to enhance or optimize the efficiency of processors, whether operating in synchronous or asynchronous mode, there always remains room for improvement.

SUMMARY

Some processors have a pre-execution pipeline that share resource(s) of a given type. The shared resource(s) of a given type will be referred to herein as a resource(s) of interest. In such processors, instructions may be assigned centrally, but the resource of interest is not used immediately upon dispatching of the corresponding instruction. This can be the case, for instance, when the associated instruction is assigned to a queue of an execution unit, and where the resource of interest is a temporary storage resource which stores the result of the execution temporarily so that the result of the execution is available to a subsequent instruction. In such a case, the resource of interest is only used in relation to the instruction after the execution has been performed by the execution unit and the instruction result has been produced by the execution unit. Further, the resource of interest is only used after sufficient time has elapsed to allow the instruction to proceed along the queue and for the execution to be performed by the execution unit.

A first possibility would be to base the indication of unavailability of such resources of interest on the moment in time at which the resource(s) of interest are being assigned and dispatched in relation to a first instruction. In such a case, the indication of availability can be based on the moment in time, subsequent to the queue, when the use of the resource in relation to the first instruction has ended. In such as case, it is possible that the resource of interest appears to be unavailable at the time of assigning a second, subsequent instruction even though, in fact, the resource has been released in relation with the first instruction by the time the second instruction arrives.

Nonetheless, in cases where no resources of interest appear available at the time an associated instruction is assigned, the pipeline can be stalled until the corresponding resource appears to be available. This stalling can be performed in order to avoid 'collisions' at the resource of interest. Such stalling events were rather addressed by increasing the quantity of the resource of interest in the integrated circuit of the processor. However, such a solution introduces significant cost in terms of available resource space in the integrated circuit.

In this specification, examples are presented where such resource(s) of interest are oversubscribed based on their expected frequency of use in view of specific applications. More specifically, the pre-execution pipeline includes a resource tracker which has a plurality of credit units used to track the availability of the corresponding resource(s) of interest. The quantity of 'credits' made available in the resource tracker for the corresponding resource(s) of interest is greater than the quantity of the corresponding "physical" resource(s) of interest in a ratio which can be selected as a function of the specific application.

Accordingly, where a first 'credit' associated with a specific resource of interest has already been assigned in relation to a previous instruction, a second 'credit' associated with the same specific resource can be assigned to a second instruction. This assignment can be performed even if the use of the specific resource of interest in relation with the first instruction has not ended, if it is expected that such use will have ended when the time comes for the use of the specific resource of interest in relation with the second instruction to begin.

This oversubscription of the resource(s) of interest can also be referred to as a process where 'virtual resources' of a number greater than the corresponding quantity of available 'physical resources' are assigned at the pre-execution stage.

Indeed, matching of the virtual and physical resource can be performed based on an expected availability of the physical resource. The actual availability of the physical resource can be confirmed immediately prior to use. In other words, the expected availability of the resource can be tracked using a quantity of credits which is greater than the quantity of resources these credits are used to track, which can be described as allocating virtual resources rather than allocating physical resources.

In accordance with one aspect, there is provided a method of handling an instruction data in a processor chip having a pre-execution pipeline sharing a plurality of resources including at least one resource of interest. The processor chip can also have a resource tracker having more than one credit unit associated with each one of said at least one resource of interest. The method can include the following steps: the pre-execution instruction pipeline decoding the instruction data to determine a resource requirement including a quantity of virtual credits required from the credit units for the at least one resource of interest; checking the resource tracker for an availability of said quantity of virtual credits and; if the availability of the amount of said virtual credits is established, i) dispatching the instruction data, and ii) subtracting the quantity of said credits from the resource tracker; a given period of time following said dispatching, using the at least one resource of interest in relation with the instruction data; and adding the quantity of said virtual credits back to the resource tracker if the use of the at least one resource of interest in relation to the instruction data has ended.

In accordance with another aspect, there is provided a processor chip having a pre-execution pipeline sharing a plurality of resources. The resources include at least one 'resource of interest' associated with at least one execution unit. The resources also include a queue with a plurality of entries arranged in such a manner that the at least one resource of interest is used only after exiting the queue. The processor chip also has a decoder, a resource matcher, and a resource tracker having more than one credit unit associated with each one of said at least one resource of interest.

The processor chip further may have an electrical connection between the decoder and the resource matcher to communicate a resource requirement including a quantity of virtual credits required from the credit units for the at least one resource of interest, and an electrical connection between the resource matcher and the resource tracker to communicate a resource availability including a quantity of virtual credits available based on a status of the credit units. The pre-execution pipeline is operable to dispatch the instruction data to the queue and to update the status of the resource tracker based on a determination, by the resource matcher, that the quantity of said virtual credits required is available. The processor chip is operable for adding the amount of virtual credits back to the resource tracker when said use of the resource of interest in relation to the given instruction data has ended.

In accordance with one aspect, there is provided a method of handling an instruction data in a processor integrated circuit having: a decoder and a plurality of shared resources; a resource tracker having a plurality of credit units associated with certain corresponding ones of the shared resources in a manner to be updatable based on availability of those shared resources; and a resource matcher connected to receive a resource requirement signal from the decoder and connected to receive a resource availability signal from the resource tracker. The method can include: determining whether or not the resource requirement signal matches the resource availability signal, and, upon a positive determination; dispatching a corresponding instruction data, updating the status of a corresponding one or more of the credit units, and preventing the resource matcher from performing a subsequent determination for given period of time after the positive determination.

In accordance with one aspect, there is provided a resource manager forming a portion of a processor integrated circuit having a decoder and a plurality of shared resources. The resource manager can include a resource tracker having a plurality of credit units connected to corresponding ones of the shared resources. The resource tracker can be can be updated based on the availability of the resources.

In accordance with another aspect, there is provided a processor having a having a pre-execution pipeline said pre-execution pipeline including a resource of interest, said processor also comprising: a queue associated with said resource of interest, a resource tracker configured to associate a plurality of credit units with said resource of interest, and configured to account in said credit units for instruction data added to and removed from said queue, a decoder configured to identify a requirement, for said resource of interest, in instruction data, and a resource matcher for, as a prerequisite for adding instruction data to said queue, comparing said requirement with said plurality of credit units to determine virtual availability for oversubscription of said resource of interest.

The resource manager can further include a resource matcher. The resource matcher may receive a resource requirement signal from the decoder and a resource availability signal from the resource tracker. The resource matcher can have a combinational gate circuit designed based on the Karnaugh map methodology to determine whether or not the resource requirement signal matches the resource availability signal. The resource manager can dispatch a corresponding instruction data to, and update the status of, a corresponding one or more of the credit units upon a positive determination by the resource matcher. The resource manager can further include a pulse generator circuit electrically connected to a clock and to the resource matcher. The pulse generator circuit may function to prevent the resource matcher from performing a subsequent determination for given period of time after a previous positive determination.

Typically, the resource requirement signal can be provided in the form of a multiple bit signal communicated by an electrical connection in the form of a bus having multiple independent sub-connections associated with the independent bits.

In accordance with one aspect, there is provided a method of handling a given instruction data in a processor chip having a pre-execution pipeline sharing a plurality of resources including at least one resource of interest, the processor chip also having a resource tracker having a given number of credit units available for the at least one resource of interest.

The method can include: the pre-execution pipeline decoding a first instruction data including a resource requirement for one of the resources of interest; determining the availability of a given one of the at least one resource of interest based on the resource tracker; and, based on said determination, dispatching the first instruction data for use of the given resource and updating a first credit unit associated with the given resource to indicate unavailability prior the use of the given resource in relation with the first instruction data; the pre-execution pipeline decoding a second instruction data including a resource requirement for one of the resources of interest; determining an availability of the given resource based on the resource tracker; based on said determination, dispatching the second instruction data for use of the given resource and updating a second credit unit associated with the given resource to indicate unavailability; and, after said dispatching of the second instruction data, effecting said use of the given resource in relation with the first instruction data and updating the first credit unit after said use.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
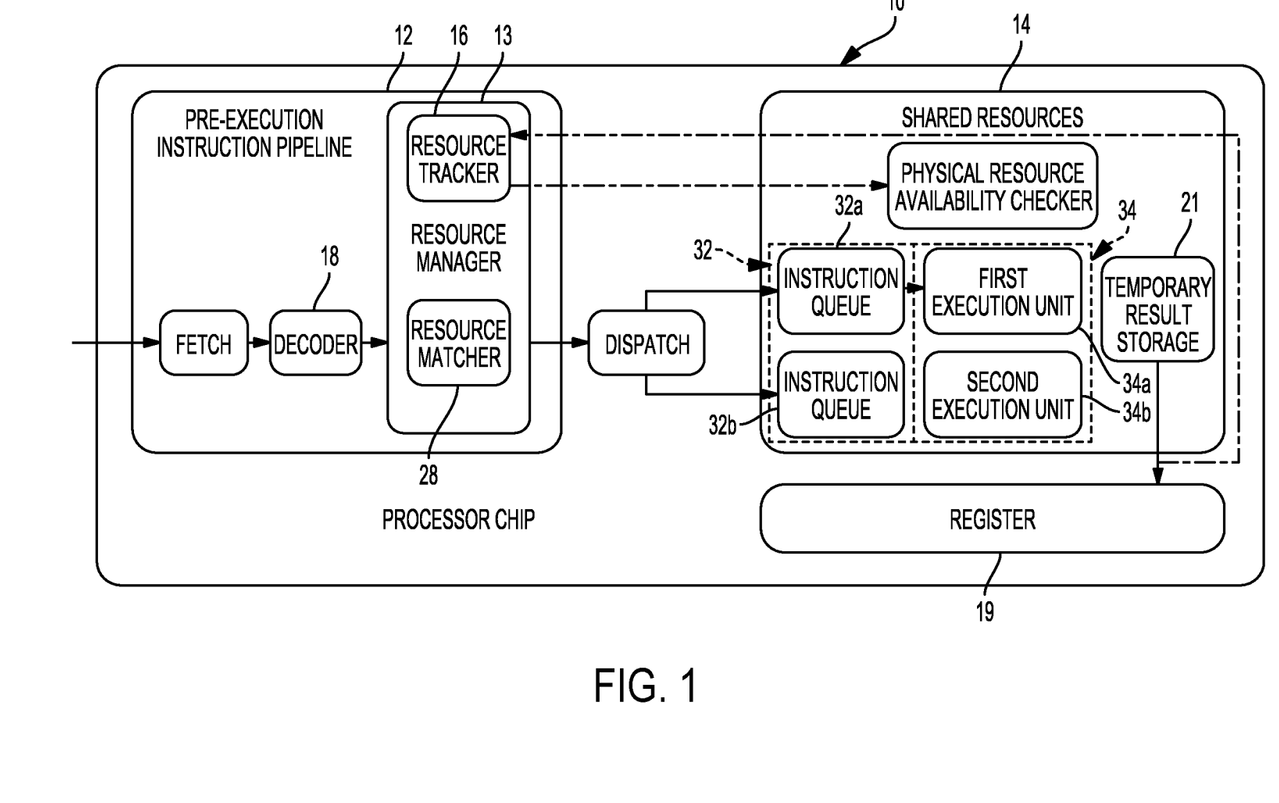
FIG. 1 is a block diagram of an example of a processor.

FIG. 1 shows a simple example of a processor 10 having a pre-execution instruction pipeline 12 sharing a plurality of resources 14. Typical embodiments will likely have more than two resources 14, but a simple case is discussed first for ease of understanding. The shared resources 14 can be of a same resource type (e.g. a plurality of individual entries of a queue 32 of a given execution unit 34) or of a number of different resource types (e.g., individual queue entries of a first execution unit are of a first resource type, individual queue entries of a second execution unit being of a second resource type, individual registers of a shared temporary result storage for both these units being of a third resource type, etc.). Some of the resources are not oversubscribed and, thus, have a total quantity of available credits corresponding to the one or more of the corresponding resources which is equal to the total quantity of the corresponding resources.

For instance, the number of credits available for the queue 32 of each one of the execution units 34 is equal to the number of entries of the respective queue 32. Indeed, some processors having a plurality of execution units 34 can be operated in a manner whereby the result of one instruction is required in order to perform the second execution. In such cases, the result of the first instruction can be held in a temporary storage for fast access in relation with the second instruction instead of being transferred directly to the destination register 19. It will be understood that the portions of the integrated circuit which are used to manage the resources 14 will be collectively referred to herein by the expression resource manager 13/13a.

Figure 2A:
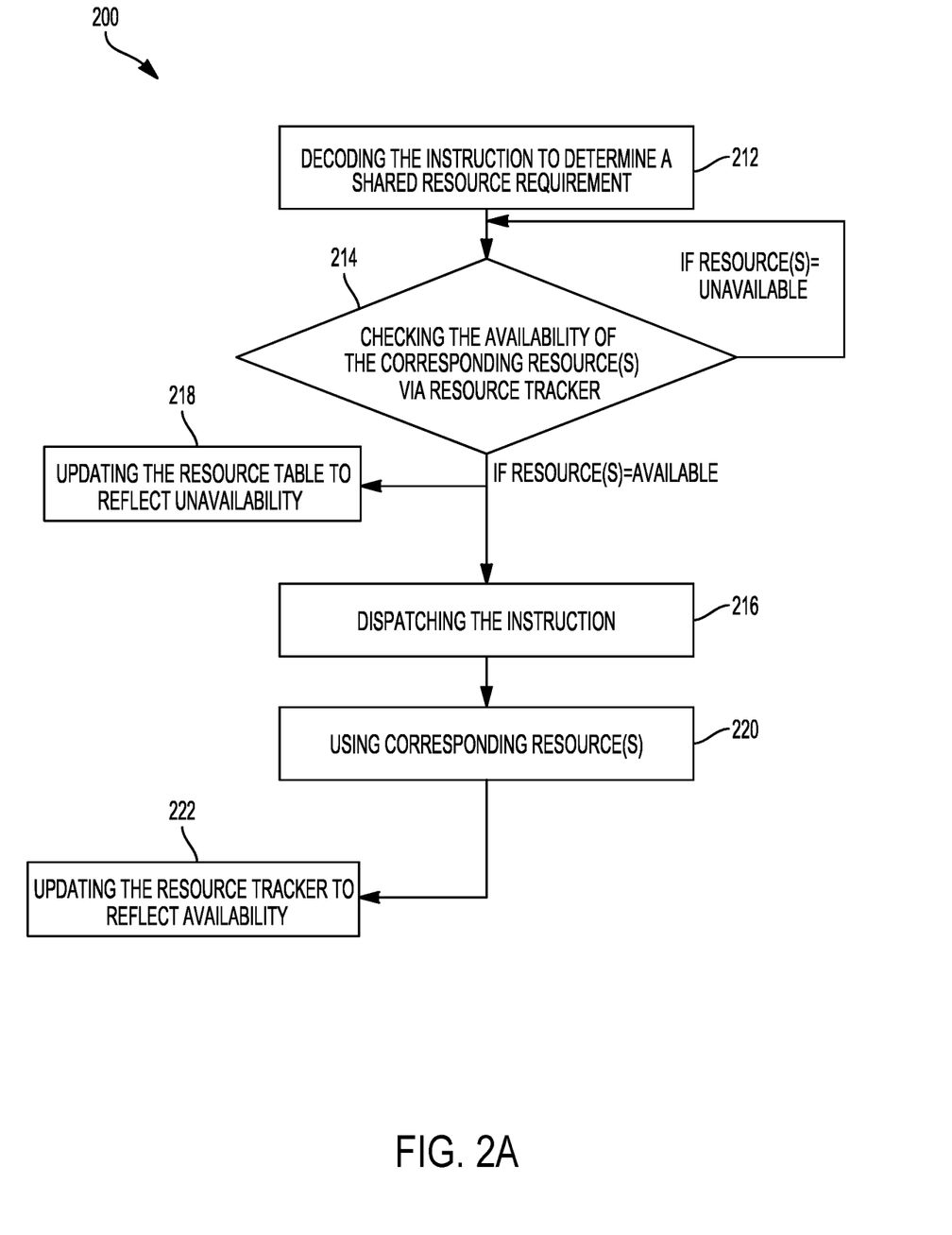
FIG. 2A is a flow chart illustrating the operation of a processor without oversubscription.

An example of a non-oversubscribed mode of operation is illustrated in the flow chart 200 presented in FIG. 2A. The pre-execution instruction pipeline 12 includes a decoder 18 for an a priori decoding 212 of the instructions to determine the shared resource requirement associated with a specific one or more of the successive instructions in the pre-execution instruction pipeline 12. A resource matcher 28 checks 214 the availability of the corresponding resource(s) 14 via the resource tracker 16 which acts as a form of centralized scoreboard, and, dependent upon a determination that the corresponding resource(s) is (are) available, the instruction is dispatched 216 for use 220 in relation to the corresponding resource(s) 14 and the resource tracker 16 is updated 218 simultaneously to indicate the subsequent unavailability of the corresponding resource(s). The resource tracker 16 is later updated 222 to indicate availability only once the one or more given resources 14 have been used and are no longer required by the corresponding instruction data. In this example, the update of the resource tracker can occur simultaneously with the end of the use of the given resource via an electrical connection 20 between the resource output and the resource tracker 16. It will be understood that the expression 'simultaneous' is used herein not in the strict mathematical sense, but rather so as to encompass expected transmission delays which can be relatively small by comparison to a period of time of execution of the instructions, for instance. Alternate embodiments can have more than one instruction pipeline operating simultaneously.

Figure 2B:
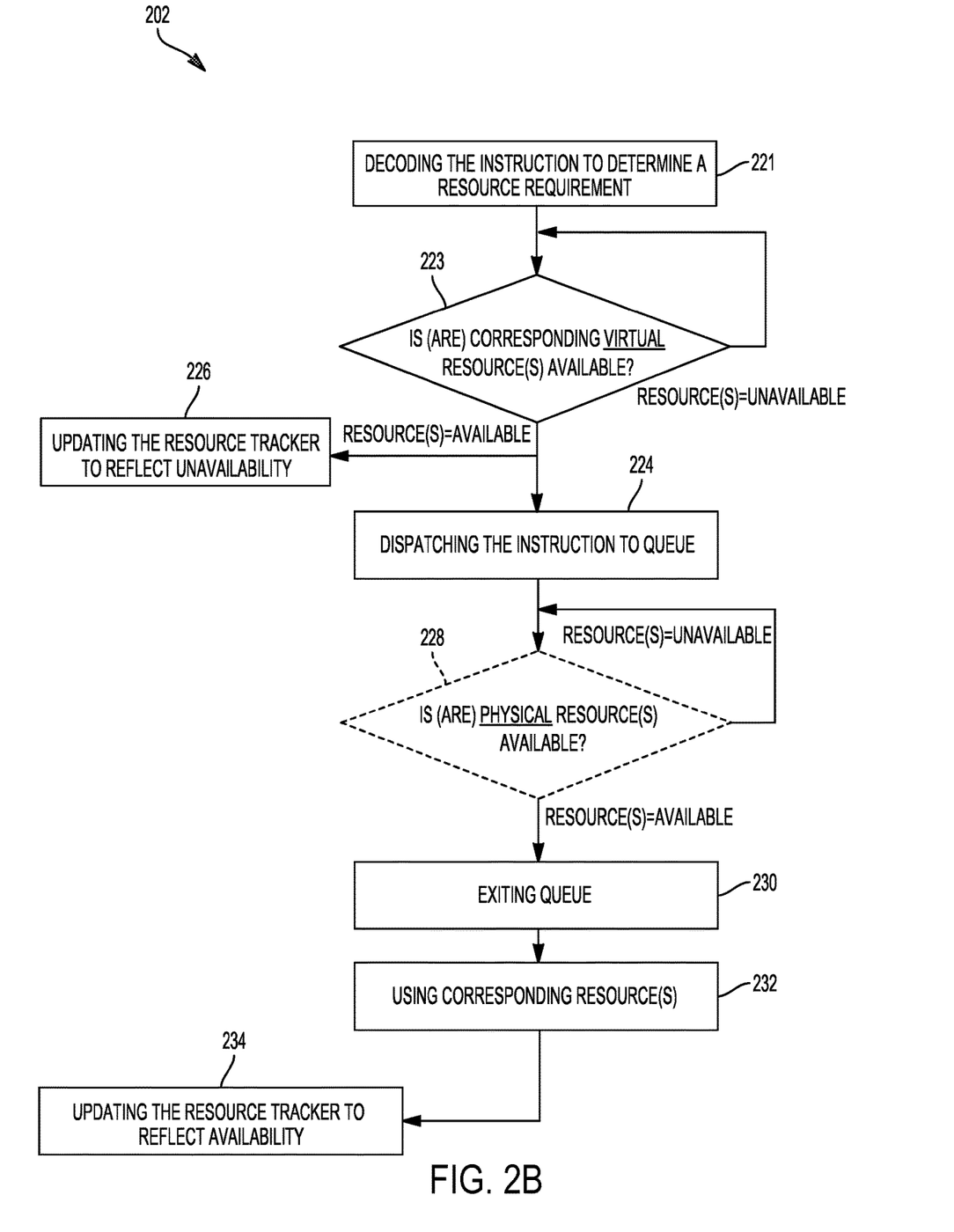
FIG. 2B is a flow chart showing the operation of the processor of FIG. 1 with oversubscription.

An example of an oversubscribed mode of operation is illustrated in the flow chart 202 presented in FIG. 2B, which can be applied to one or more of the resources 14 of a single or of different resource types (the resource(s) of interest hereinafter). These resource(s) of interest (e.g., the temporary registers) are used in relation to a corresponding instruction only a given amount of time after having been dispatched by the pre-execution pipeline 12 (the temporary registers 21 are only used after having proceeded along the queue 32 and subsequently to the execution of the instruction by the execution unit 34, in the embodiment shown in FIG. 1).

Referring again to FIG. 2B, the decoder 18 decodes 221 a specific one of the instruction data (the given instruction data hereinafter) and determines from the instruction data whether there is a requirement for the resource(s) of interest in relation with this instruction data. The requirement can be for one or more of the resource(s) of interest, but let us consider now an example where the requirement is for a single physical one of the resources of interest (referred to as the given resource of interest hereinafter).

The resource tracker 16 has more than one credit available for the given resource of interest, and the resource of interest is thus oversubscribed. In this context, the credits can specifically be referred to as virtual credits. The resource matcher 28 accesses the resource tracker 16 to determine 223 whether a virtual credit for the given resource of interest is available and, upon determining the availability of one virtual credit, dispatches 224 the instruction. The resource tracker 16 is simultaneously updated 226 to subtract the virtual credit corresponding to the dispatched given instruction data. In the embodiment illustrated, an additional checking step 228 is performed prior to allowing the given instruction data to exit 230 the queue 32 and to be processed by the corresponding execution unit 34, to ensure that the actual, physical, given resource of interest is indeed available and to prevent collision with the results of an other instruction data in the temporary storage. The virtual credit is returned (added) 234 to the resource tracker 16 only once the use 232 of the given resource of interest in relation with the given instruction data is deemed to have ended. In other words, the resource tracker can be configured to associate a plurality of credit units with said resource of interest, and configured to account for instruction data added to and removed from said queue in credit units.

An example mode of operation can be described with reference to FIG. 2B. Two virtual credits are available for a given resource. Decoding a first instruction yields a requirement for the given resource. The processor executing the instruction can be assigned this given resource of interest; exclusivity is obtained by consuming a first virtual credit of the given resource of interest. If execution of a second instruction requires access to the same resource, then it can also be assigned to the given resource of interest by consuming the second virtual credit. The given resource of interest is consumed in relation to the first instruction data at a moment in time when the second instruction data is in queue 32 leading to the execution unit 34. The first virtual credit is released once the use of the resource of interest in relation with the first instruction data has ended. When the second instruction data exits the queue 32 and proceeds to be executed by the associated execution unit 34, the resource of interest has been freed in relation to its use by the first instruction and is thus available for use by the second instruction.

In other words, the resource matcher can compare the requirement with the plurality of credit units to determine virtual availability for oversubscription of the resource of interest, as a prerequisite for adding instruction data to said queue.

The embodiment shown in FIG. 1 is slightly more complex as one of the potential types of resources of interest is temporary storage. Further, a plurality of temporary storage registers are shared by a first execution unit 34a (e.g., Arithmetic & Bit Manipulation unit) and by a second execution unit 34b (e.g., a Multiplication and Division unit), and corresponding first and second instruction queues 32a, 32b. Accordingly, the resource tracker 16 has a given number of virtual credits available for the temporary result storage 21, and the number of virtual credits available is greater than the amount of physical registers of the temporary storage. For instance, let us consider an example embodiment based on the block diagram of FIG. 1 where four (4) physical registers of combined temporary storage (associated with a given type of resource of interest) are available for both the first and the second execution units 34a, 34b. The resource tracker 16 can have 8, 12, 16 or another quantity of virtual credits available for the four (4) physical registers of the temporary result storage 21. The ratio of virtual credits to available physical resources can be determined during design of the processor 10 as a function of the expected percentage of use of the resources of interest based on the type of instruction data the processor 10 is designed to process.

Figure 3A:
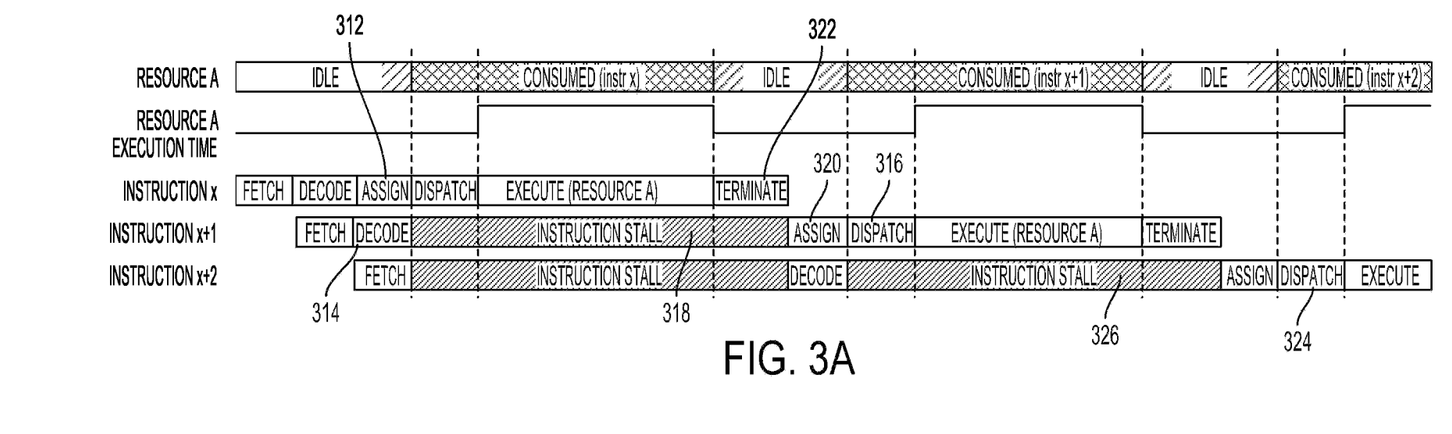
FIG. 3A is a schematic representation of an example program execution with a processor without oversubscription.
Figure 3B:
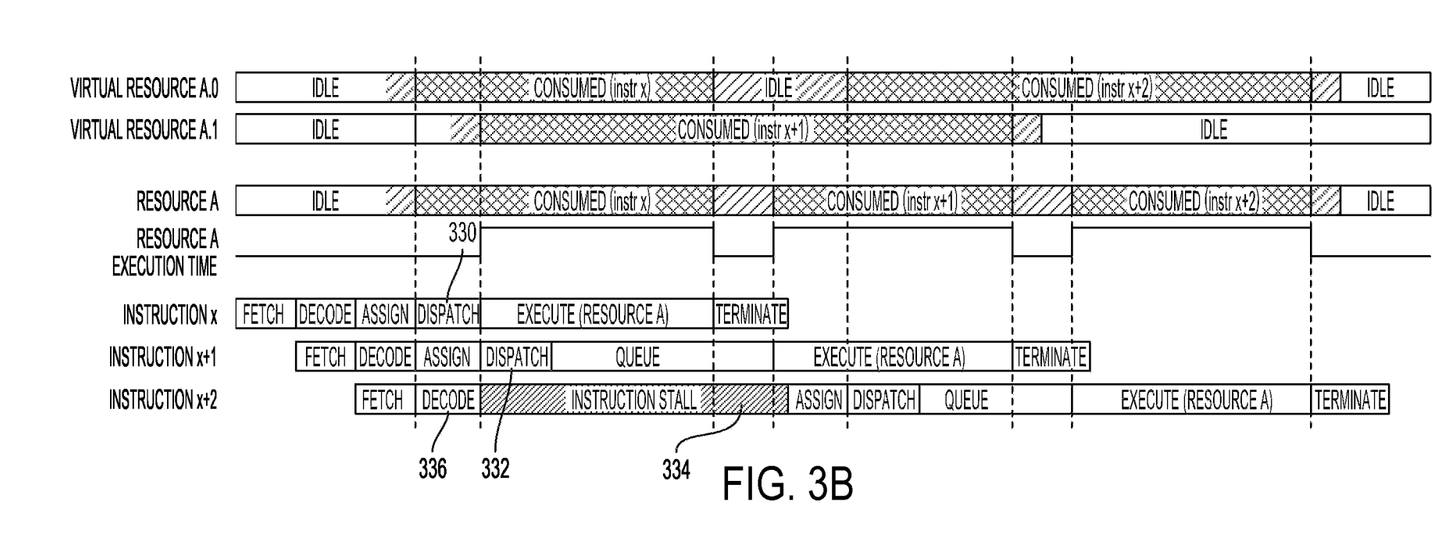
FIG. 3B is a schematic representation of an example program execution with a processor with oversubscription.

FIGS. 3A and 3B demonstrate a gain in efficiency which can be obtained by oversubscribing a resource of interest. FIG. 3A shows resource management without oversubscription in accordance with the flow chart of FIG. 2A, and FIG. 3B shows resource management with oversubscription in accordance with the flow chart of FIG. 2B.

For instance, let us consider an example program where three subsequent instructions x, x+1, x+2, require the same given resource of interest. In the case of the resource management without oversubscription (see FIG. 3A), availability is indicated based on the determination of actual assignment of the given resource of interest. Accordingly, after the first instruction is assigned 312 to the given resource of interest, the second instruction, also decoded 314 with a requirement for the given resource, cannot be dispatched 316 until the given resource of interest is freed from use in relation with the first instruction data. This results in instruction stall 318 depicted by diagonal lines. The given resource can only be assigned 320 to the second instruction, thus allowing the second instruction to be released, once the given resource is freed 322 in relation with the first instruction. Since the third instruction also requires the given resource which is then associated with the second instruction, the third instruction cannot be dispatched 324 and the processor 10 is stalled 326 again.

In the scenario of FIG. 3B, two virtual credits are assigned to the given resource. Once the first instruction data has been dispatched 330 using the first virtual credit, the second instruction data can be dispatched 332 using the second virtual credit. Only the third instruction data is stalled 334 since at the time where it is decoded 336, the two available virtual credits have been consumed.

Figure 4:
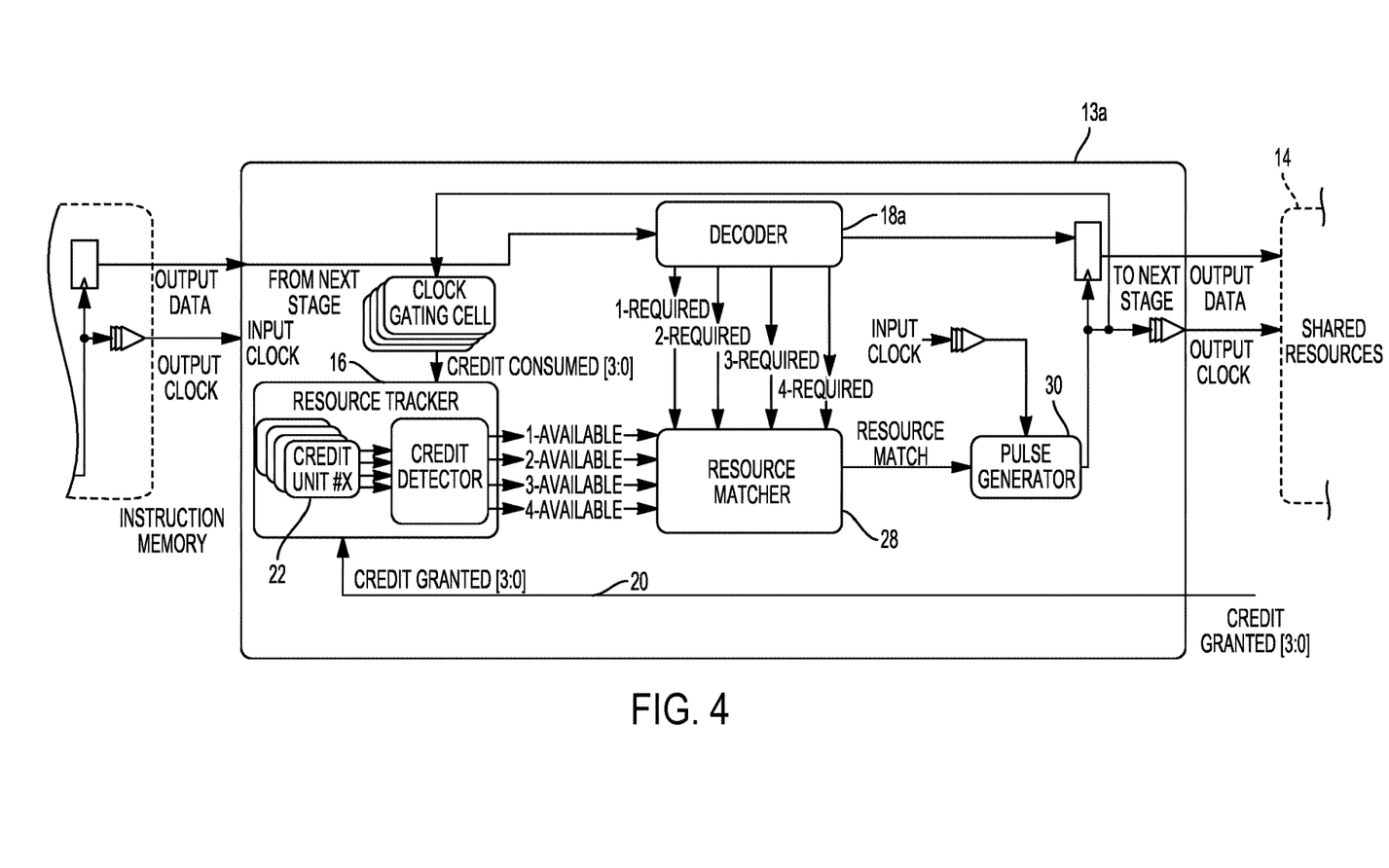
FIG. 4 is a schematic view of an example of a resource matching stage of the processor of FIG. 1.

Referring now to FIG. 4, in this example, the resource tracker 16 can be embodied with a plurality of credit units 22, with each credit unit 22 being associated with a corresponding one or more of the shared resources 14. Some of the resources 14 can be oversubscribed whereas others can be non-oversubscribed. The decoded shared resource requirement can specify a quantity of required credits (this can be one or more credits) of the same type and/or of multiple types, and the credit units associated with the corresponding resource type are checked to determine if a sufficient quantity of credits are available.

Figure 5:
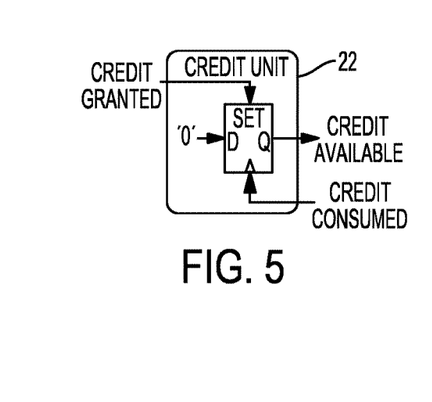
FIG. 5 is a schematic view of an example of a credit unit of the processor of FIG. 1.

Upon such determination, the instruction data can be dispatched and the update (by subtraction of credits) is performed. Similarly, once the given resource(s) are freed (e.g. their use in relation to the dispatched instructions is terminated), they can individually update (by addition of credits) their corresponding credit unit in the resource tracker 16 via the electrical connection 20 in the chip 10. An example of a credit unit 22 is shown in FIG. 5.

In a simple scenario, the decoder 18a can be adapted to decode only a single instruction at a time, in which case the resource matcher 28 and the resource tracker 16 can be fairly simple and can be tasked with checking whether or not a particular resource 14 associated with the instruction is available. Typical embodiments, however, can be more complex, comprising a decoder 18a adapted to decode a plurality of instructions at once. In such a 'multiple instruction' embodiment, the resource matcher 28 and the resource tracker 16 can also be adapted to deal with more than one instruction, and more than one resource request of the same type, at once. In a case where the decoder 18a supports multiple decoding within a single instruction, the decoder 18a can require resources of more than one type (e.g. 1 queue entry and 1 temporary storage register) at once.

An example of such a more complex embodiment is detailed below. This example embodiment uses a resource tracker 16 in which the credit units 22 are grouped in a number of tables associated with corresponding resource types, and the resource matcher 28 has a more complex logic circuit to determine the simultaneous availability of all required resources. Dedicated resource tables can be used for one or more specific resource types, for instance. In this specification, the expression 'instruction data' will be used to refer to the instruction which is to be decoded, whether this instruction includes a plurality of 'sub-instructions' associated with a plurality of resources 14 or only a single instruction associated with a single resource 14. The expression resource table will be used herein to refer to a group of credit units associated with a given resource type.

An instruction associated with one of the resources 14 can require one or more 'credits'. For instance, in a case of speculative execution where the resource 14 is an arithmetic and bit manipulation unit, a single instruction can include one or more requests for queue entries, and thus associated one or more credits, and one request for a temporary register to temporarily store the result of the execution once executed and make it available to another instruction. In such an example, comprising both a multiplication and division (MUL) unit, an arithmetic & bit manipulation (ADD) unit, and a temporary storage register shared between the MUL and the ADD units, both the MUL and the ADD units can have corresponding, independent, instruction queues. This example can be considered to have three (3) resource types: 1) the MUL queue, 42 the ADD queue, and 3) the temporary storage. Each resource type can have its own resource table in the resource tracker 16, with each resource table having a corresponding number of credit units. An example distribution of credits can be as follows:

MUL queue: 4 credits
ADD queue: 6 credits
Temporary storage: 4 credits.

Continuing on with this example, an example instruction data can have given bit allocation for an opcode (which can indicate whether the instructions apply to the MUL or to the ADD unit, for instance), up to two or three source registers and a destination register.

In practice, one challenge in embodying this solution is to avoid potential errors which might result from reading the resource tracker status if it has not been updated since the last dispatch of instructions.

Figure 6:
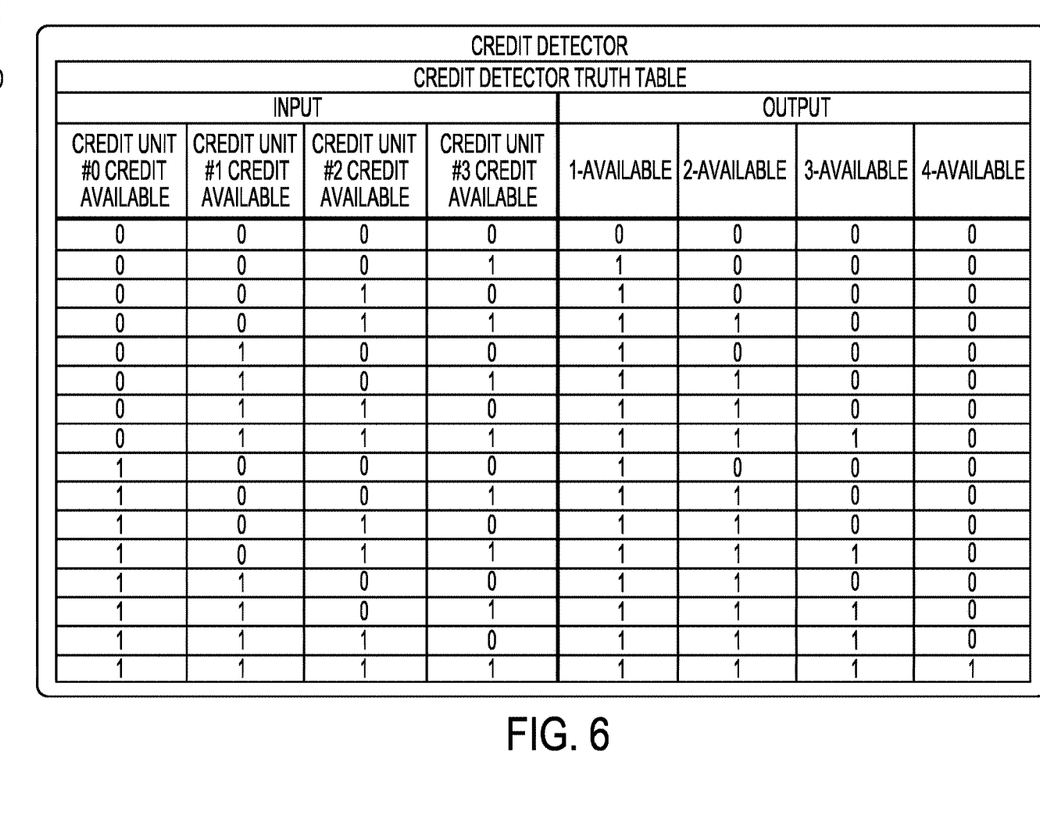
FIG. 6 is a truth table representation of the input to output relationship of the resource tracker of the processor of FIG. 1.
Figure 7:
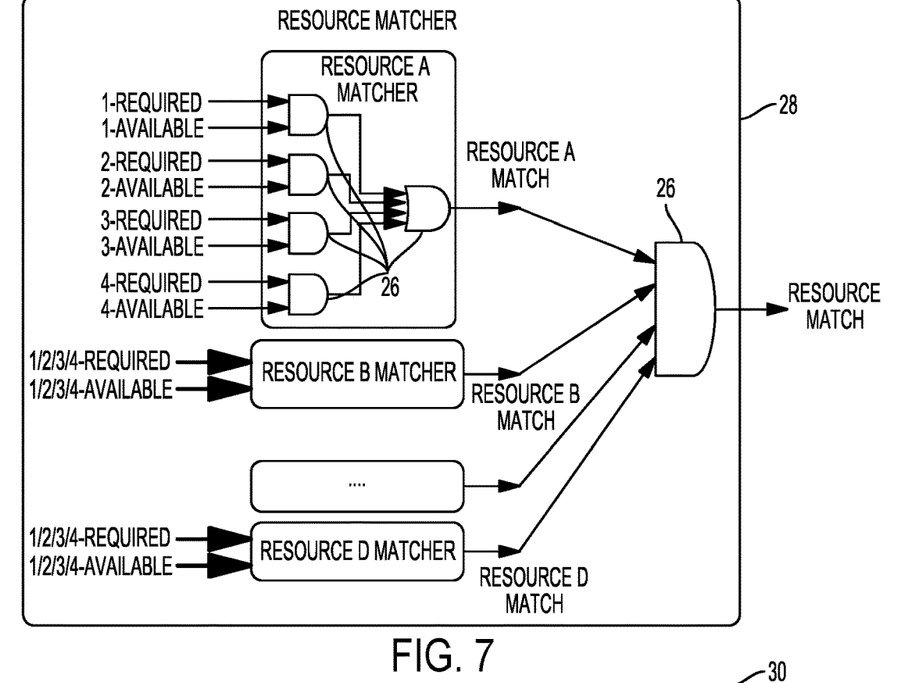
FIG. 7 is a schematic view of an example of a logic-based resource matcher for the processor of FIG. 1.

In this specific example, this challenge is addressed on one front by designing the resource tracker 16 in a manner to avoid glitches in the indication of credit availability. More specifically, the indication of credit availability uses the individual credit units which are read via a resource matcher 28 having a combinational gate circuit (e.g., logical gates 26). Indication of credit availability is made glitchless using the Karnaugh Map methodology, an example of which is shown in FIGS. 6 and 7, to match the resources 14. Indeed, using the Karnaugh Map methodology, redundant paths can be created to avoid glitches. Based on the inventor's experience with similar technologies, it is believed that this configuration can be satisfactorily 'glitchless'.

Figure 9:
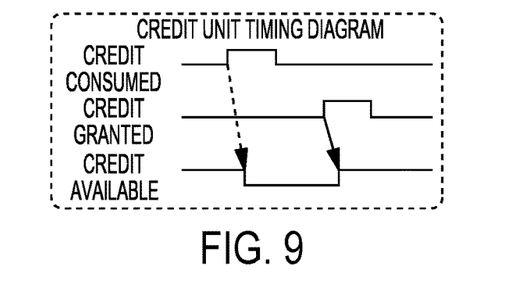
FIG. 9 is a schematic view of an example credit unit timing diagram for the processor of FIG. 1.

The possibility of basing the 'matching' of the instruction data based on an 'out of date' reading of the credit units of the resource tracker 16 also poses a challenge. For example, values may be read prior to the complete updating of the resource tracker 16). In this specific example, this challenge is addressed by way of a pulse generator which, based on a timed input associated with an updating delay, masks any new requests that could be generated based on an outdated resource status. This process is shown in FIG. 9. Here, a single pulse is generated. The rising edge of the pulse is used to "enable" the sequential elements connected to the pulse to "sample and hold" the input on their output. In this specification, the pulse generation can be considered as being based on a clock signal given its 'period' feature. It will be understood that this expression does not imply that the pulse generation is governed by the rhythmic rise and fall of a central clock.

Indeed, since register (flip-flop, or FF, or sequential logic) gates are used to implement the credit units, glitches are not created. Glitches could stem, however, from the combinational logic (i.e., AND, OR, XOR, . . . gates) where inputs arrive at different times and the logic function of the gates creates very small pulses (i.e., glitches) until the logic circuit is stabilized. An example pulse generator 30 which, based on the inventor's experience with similar technologies, is believed to be adapted to generating a suitable on-demand pulse of a given duration (a clock pulse) in this context, is illustrated in FIG. 8.

Figure 8:
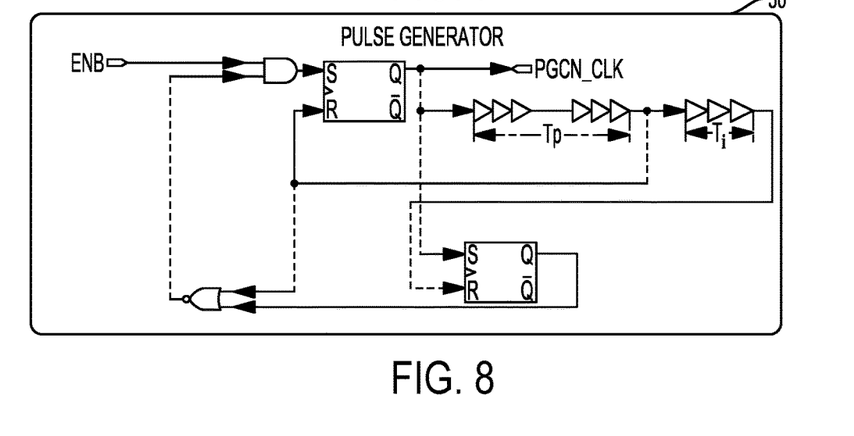
FIG. 8 is a schematic view of an example pulse generator for the processor of FIG. 1.

In FIG. 8, the pulse generator 30 generates a mask which is active during a certain period of time after the resource match, during which all subsequent requests are ignored. More specifically, upon generating a pulse, the corresponding credit(s) are updated as no longer being available. The process of updating the credit can take a certain period of time to stabilize. If a reading is performed prior to the stabilization, a previous version, or an otherwise incompletely updated version of the resource table can be read. Preventing the reading of the resource tracker 16 during this period can avoid potential dispatch of new instructions where the update from a previous dispatch is not yet completed, and where the resource would be incorrectly indicated as being available when, in fact, it is not. The returning of the credits, by comparison, can occur at any moment and the associated combinational gate circuit is thus required to be glitchless.

Referring back to the example presented above, but using a glitchless circuit, the decoder 18a receives the instruction data and communicates resource requests to the resource matcher 28 as follows: 3 credits for the ADD queue and 1 credit for the temporary storage register. A first combinational gate circuit of the resource matcher 28 accesses a first table of the resource tracker 16 to check the availability of the three (3) credits for the ADD queue. A second combinational gate circuit accesses a second table of the resource tracker 16 to check the availability of the temporary storage register 21. An 'and' gate is provided at the end of the individual, table-specific, logic gate circuits, to combine all the resource types, match statuses, and to trigger the pulse generator 30 and dispatch the instruction only if all the resource requirements are satisfied.

In this specification, the expression combinational gate circuit will be used freely to encompass embodiments having a single combinational gate circuit associated with a given type of resource, or having a multitude of individual combinational gate circuits combined to one another via an 'and' gate.

This particular glitchless combinational gate circuit and pulse generator combination can alternately be embodied, for example, in a very simple processor without speculative execution capability. For example, a processor having only a single resource and being only adapted to treat a single instruction at a time. Such an embodiment can be useful in performing tests, for instance.

Figure 10:
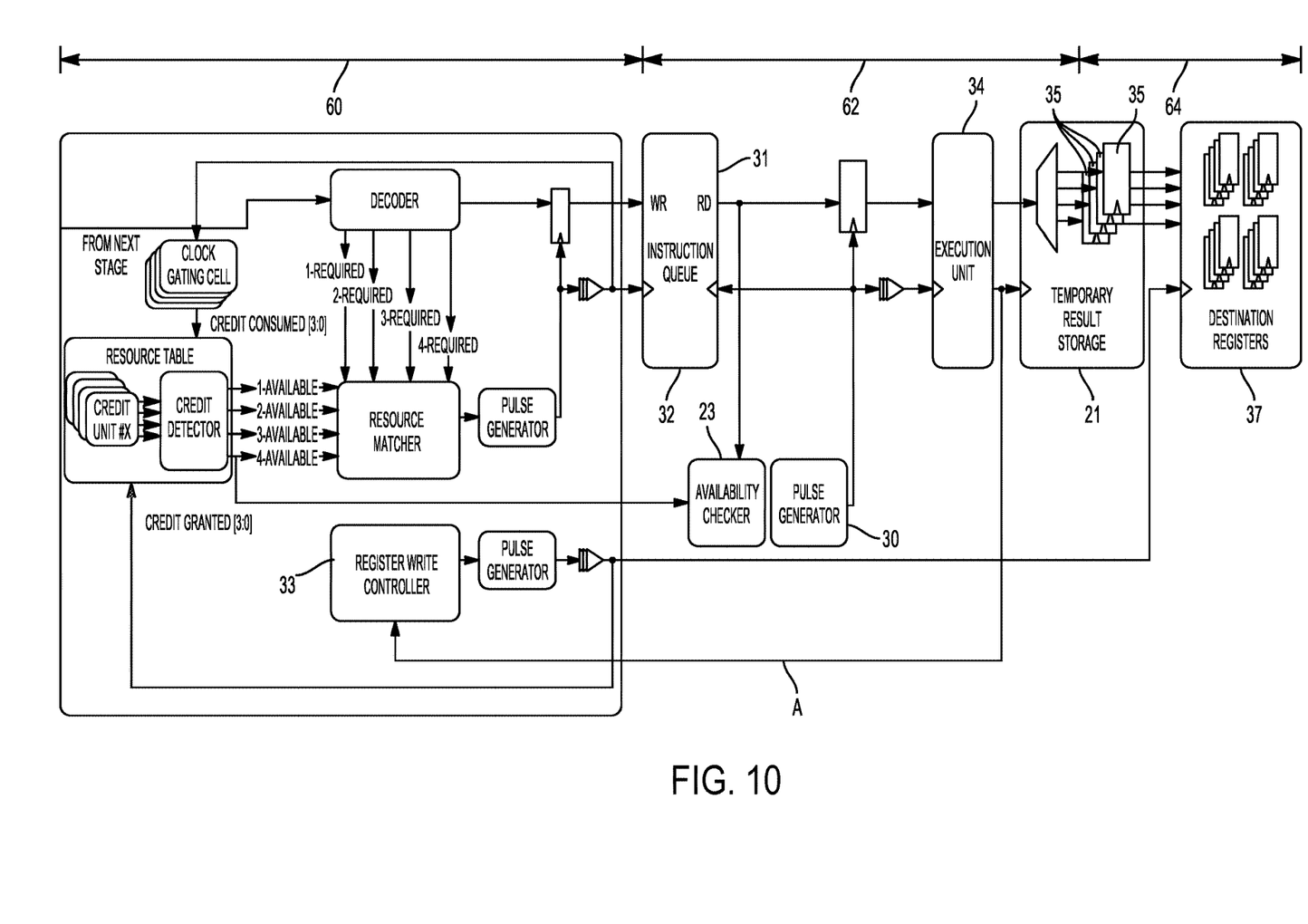
FIG. 10 is a schematic view showing aspects of a processor including an example of a physical resource availability checker.

FIG. 10 is a full lifecycle diagram incorporating of an example embodiment having a physical resource availability checker 23. The diagram represents a period of time spanning from the decoded stage and resource assignment (the evaluation stage 60) to the execution stage 62 (instruction queue, execution unit and temporary storage), until the termination stage 64 (transfer from the temporary register to the destination register). More specifically, the availability checker 23 can be associated with the components of the integrated circuit which are responsible for determining whether or not, at a time associated with possible use of the resource of interest in relation with the associated instruction (as opposed to a time of assignation), the resource of interest is indeed available.

In this example, the physical resource availability checker 23 is provided in the form of a module positioned at the 'read' interface 31 of the instruction queue 32. The checker module 23 is used to confirm the availability of the physical temporary register associated with the instruction data at the read interface 31 of the instruction queue 32. Once availability is confirmed, a pulse generator 30 functions as a clock that transfers the instruction from the queue 32 to the execution unit 34. The computation instruction is executed and the result is written to the physical temporary register 35 (de-multiplexer represents the action of sending the result to an assigned temporary register from among the many temporary registers 35).

Continuing the above example, once the result is written in the temporary register 35, as illustrated by the arrow A extending from the output of the execution unit 34 to the register write controller 33, the register write controller 33 causes the result to be written to the destination register 37. A description of the process by which writing to the destination register occurs follows. Once speculation is cleared from that instruction result, the register write controller 33 requests the transfer from the temporary register 21 to the destination register 37 (which is also performed with a pulse generator in this specific example).

In an example embodiment, the register write controller 33 will send an in-advance transfer request to the temporary storage register 35. The request can remain pending until the temporary result storage 21 is updated with the result. By contrast with than waiting for the status to get back to the register write controller 33 and then requesting the transfer, scheduling in advance of a transaction may result in much faster execution of write requests. Concurrently with the transfer of content from the temporary storage register 21 to the destination register 37, the physical temporary register 35 becomes available again such that any instruction in the queue that requires the same physical temporary register can be launched.

Figure 11:
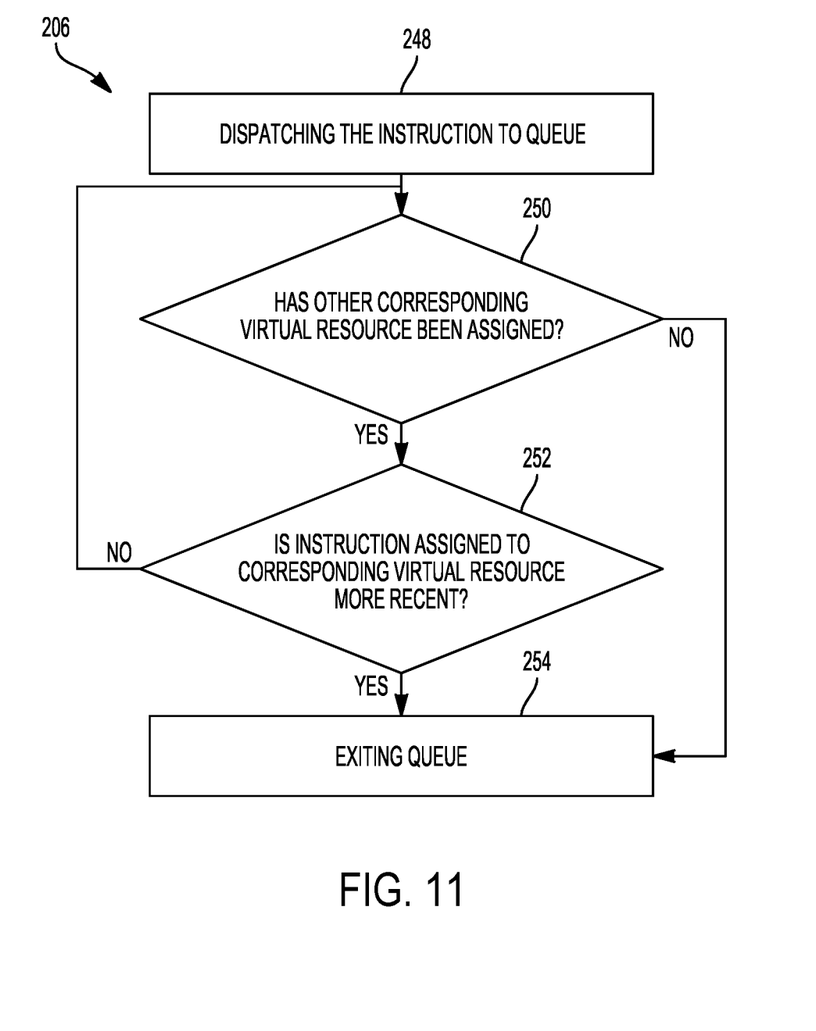
FIG. 11 is flow chart showing a mode of operation of the physical resource availability checker of FIG. 10.

FIG. 11 shows an example flow chart 206 depicting the mode of operation of the physical resource availability checker 23 shown in FIG. 10. After the instruction has been dispatched 248 to the queue, in a first step, the physical resource availability checker 23 determines 250 whether the other virtual credit(s) associated with the given resource of interest are assigned or not. If the other virtual credit(s) are not assigned, then the physical resource is deemed to be available and the associated instruction data can exit 254 the queue. If the other virtual credit(s) associated with the same physical resource is assigned, then a determination 252 is made as to whether the instruction regarding which other virtual credit has been assigned is more recent than the instruction at the read (exit) of the queue. If the other instruction is more recent, the physical resource is deemed to be available and the associated instruction data can exit 254 the queue and be processed. If the other instruction is not more recent, the instruction is prevented from exiting the queue until the resource of interest is deemed to be available.

Figure 12:
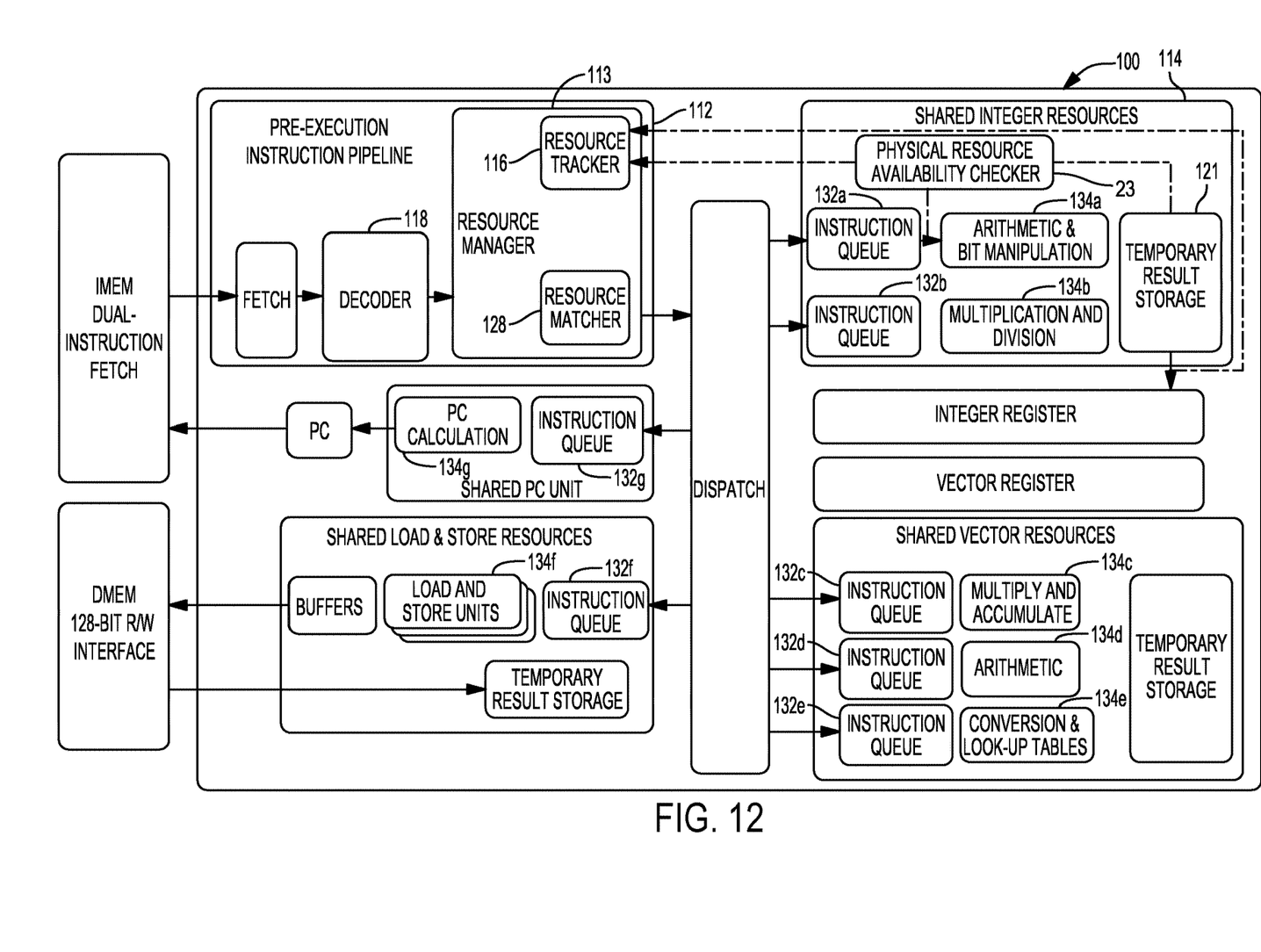
FIG. 12 is a block diagram of another example of a processor.

FIG. 12 schematizes an example of a more detailed processor 100 where the mode of oversubscription of a resource of interest can be performed for the temporary result storage 121, and where other shared resources are not oversubscribed. For instance, the shared resources 114 can include a plurality of entries of one or more queues 132a-g associated with respective execution units 134a-g. For each subsequent instruction, a corresponding credit is allocated and subtracted from the corresponding credit unit where, for the non-oversubscribed resources, the amount of available credits is equal to the amount of available resources. As each instruction is individually transferred from one of the queues 132a-g to a corresponding one of the execution units 134a-g, the respective credit unit is updated to indicate availability.

In another example, any single instruction data can require more than one entry in the queue. In both these scenarios, if a request is made for a given quantity of credits, and the given quantity of credits is determined to be unavailable, the pipeline 112 can stall the instructions until: i) a corresponding quantity of further instructions are processed by the corresponding execution unit 134a-g; ii) the resource tracker 116 has been updated; and iii) the given quantity of credits are determined to be available. In such an embodiment, the resource manager 113 can further include an instruction tracker adapted to monitor 'in flight' instructions, with each 'in flight' instruction being associated with a unique tag. However, it will be understood that such an instruction tracker is application-specific and can be avoided in alternate embodiments. The expression 'in flight' is used here to refer to an instruction which has been dispatched. The 'in flight' status is cleared when the instruction is terminated.

In this embodiment, the seven queues can each be associated with a corresponding one of the resource tables (the load and store unit can have two credits, for instance), and all the resource tables can be dealt with using a common decoder 118 and resource matcher 128. A common matcher and pulse generator constrain the given pipeline 112 to wait for all resources of all decoded instructions to be available. In a processor that has more than one pre-execution pipeline 112 (i.e., a processor that fetches and decodes multiple instructions in parallel) multiple instances of the decoder 118, resource matcher 128, and pulse generator can be provided—one per decoded instruction. Corresponding groups of the resource tables can be associated with each combination to allow individual instruction dispatch.

The pre-execution instruction pipeline 112 can receive a sequence of instructions. Each individual instruction can have at least one request for a corresponding type of shared resource 114. The flow of instruction data can travel sequentially from one stage to another and each individual instruction data can be allowed to move from the evaluation (pre-execution) to the execution stage if the required quantity of credits is available. Accordingly, in one example, the pre-execution pipeline 112 can match the corresponding instruction with one or more required resource(s) or potentially stall the pipeline 112. Once dispatched, the instructions are demultiplexed to the different execution units 134 a-g. A plurality of examples of shared resources 114 which can have instruction queues 132a-g with potentially varying quantities of entries, are shown in FIG. 12 such as integer arithmetic and bit manipulation unit 134a, integer multiplication and division unit 134b, vector multiply and accumulate unit 134c, vector arithmetic unit 134d, vector conversion & look-up table unit 134e, load and store unit(s) 134f, pc calculation unit 134g, etc. In a variant, a different combination of resource types can be present, including other resource types than those illustrated, and some or all of the resource types can be provided without queues. In still another variant, a given resource table can be shared between more than one resource type. It will be understood that even though the pipeline 112 is stalled if there are no credits for the required resource and the required resource is thus unavailable, the chip as a whole can be designed specifically for a given application in a manner which minimizes such occurrences. For example, instances where the pipeline is stalled may be avoided by providing a satisfactory relative quantity of resources or queues based on an expected relative demand from the specific application.

An example set of guidelines which can be applicable to the embodiment of FIG. 12 is now presented:

1. within a stage, resource requests can be limited to a total number of resource provided (whether these are virtual resources or physical resources);
2. resource-available signals can be made glitchless by design;
3. input clock can be delayed to match the delay of the decoder 118 to ignore potential glitches in generating resource-required signals; and
4. consumed credit can originate from the generated clock with a mask that selects which resource(s) to assign.

In an example, instruction results are provided 4 temporary registers (attributed with identifiers 00, 01, 10, 11 respectively) oversubscribed with 8 virtual temporary register resources (using identifiers 000, 001, 010, 011, 100, 101, 110, 111 respectively, in a 2:1 ratio) using credits as presented above. The virtual resources 000 and 100 are associated with physical resource 00, virtual resources 001 and 101 are associated with physical resource 01, and so forth. In such an example, both the availability of a specific one of the virtual credits, and of a specific one of the physical credits can be established in a relatively simple manner. In an alternate embodiment, different mechanisms can be used to monitor the physical resources and virtual resources usage and availability.

In the embodiment presented in FIG. 12, each subsequent instruction dispatched is tagged by a specific binary sequence number between 0 and 31. The determination of whether or not a given instruction is more recent than another one can be made on this basis. Moreover, an additional bit is used to cover "wrap-around" scenarios where a less recent instruction is close to 31 and the subsequent, more recent instruction has "wrapped-around" and is numbered subsequently to zero.

When designing a processor for a specific application, the anticipated instruction profile is used to determine the quantity of resource (e.g., queue depth, type and number of calculation units, etc.) or ratio for oversubscription resources (e.g., virtual to physical temporary registers). This can lead to an increased efficiency of the processor. More specifically, for a given one or more resources having corresponding queue(s) with a given amount of entries (e.g., 6 entries) sharing the same resource (e.g., 2 temporary storage registers), the number of virtual credits can be determined based on an expected % of use of the resource for entries within the queue.

As can be understood, the examples described above and illustrated are intended to be exemplary only. Alternatives to the examples provided above are possible in view of specific applications. For instance, emerging 5G technology, as well as future technologies, will require higher performance processor to address ever growing data bandwidth and low-latency connectivity requirements. New devices must be smaller, better, faster and more efficient. Some embodiments of the present disclosure can specifically be designed to satisfy the various demands of such technologies. Embodiments of the present disclosure can also be used to upgrade equipments in the field to support new technologies or to improve future performance within existing power constraints, thus keeping replacement costs low, to name two possible examples. Specific embodiments can specifically address silicon devices, 4G/5G base stations and handsets (with handset applications being possibly focused on low power consumption to preserve battery power for instance), existing network equipment replacement, future network equipment deployment, general processor requirements, and/or more generally the increase of processor performance. In an alternate embodiment, for instance, the processor can be of non-speculative execution and have two or more shared execution units. The processor can be embodied as a digital processing unit (DSP), a central processing unit (CPU) or in another form. Example embodiments of processors oversubscribed such as described herein can operate in synchronous or asynchronous mode. The scope is indicated by the appended claims.

What is claimed is:

1. A method of handling instruction data in a processor having an architecture including a pre-execution pipeline sharing a plurality of resources, the plurality of resources including at least one resource of interest, the architecture also including a resource tracker circuit having a plurality of hardware credit unit storage elements associated with each one of the at least one resource of interest, and the architecture including a resource queue associated with the at least one resource of interest, the method comprising:
the pre-execution pipeline decoding a first instruction data to determine a resource requirement for the at least one resource of interest, checking the resource tracker circuit for a quantity of values, stored in the hardware credit unit storage elements, indicating that credits corresponding to the at least one resource of interest are available and, when a number of the credits available meets the resource requirement:
i) dispatching the first instruction data to the resource queue associated with the at least one resource of interest, and
ii) generating one or more first signals to update one or more values stored in the hardware credit unit storage elements corresponding to the at least one resource of interest to indicate the credits are not available;
after dispatching the first instruction data to the resource queue and when the at least one resource of interest is physically available, using the at least one resource of interest in relation to the first instruction data; and
generating one or more second signals to update the one or more values stored in the hardware credit unit storage elements corresponding to the at least one resource of interest to indicate the credits are available when the using of the at least one resource of interest in relation to the first instruction data has ended.

2. The method of claim 1 wherein the at least one resource of interest is associated with at least one execution unit having a first resource queue with a plurality of entries, wherein the first instruction data is next in the first resource queue for using the at least one resource of interest after a queuing period of the first instruction data.

3. The method of claim 2 further comprising checking availability of the at least one resource of interest with a physical resource availability circuit, and using the at least one resource of interest in relation to the first instruction data when the availability of the at least one resource of interest is confirmed.

4. The method of claim 3 wherein a sequence order of each subsequent instruction data is tracked, and the checking availability of the at least one resource of interest includes:
checking whether the at least one resource of interest has been assigned to other instruction data by checking the one or more values stored in the hardware credit unit storage elements corresponding to the at least one resource of interest,
when the at least one resource of interest has not been assigned to the other instruction data,
proceeding to exit of the first instruction data from the first resource queue and to using the at least one resource of interest in relation to the first instruction data, and
when the at least one resource of interest has been assigned to the other instruction data,
checking if the other instruction data is more recent than the first instruction data via the sequence order, and
when the other instruction data is more recent than the first instruction data,
proceeding to exit of the first instruction data from the first resource queue and the using of the at least one resource of interest in relation to the first instruction data.

5. The method of claim 1 wherein the resource requirement is met when the number of the credits available is at least one.

6. The method of claim 1 wherein the at least one resource of interest includes at least one temporary register of a temporary storage.

7. The method of claim 1 wherein at least one step is performed asynchronously and immediately upon completion of a previous step.

8. The method of claim 1 wherein the step of checking the resource tracker circuit is performed using a resource matcher circuit having a combinational gate circuit including at least one redundant path for avoiding glitches in an output of the resource matcher circuit.

9. The method of claim 1 wherein the generating the one or more first signals includes activating a pulse having a given duration, the pulse causing the pre-execution pipeline to ignore subsequent shared resource requirements for the given duration.

10. The method of claim 1 comprising:
when the number of the credits available meets the resource requirement, preventing a subsequent determination of whether a second number of credits available meets a second resource requirement for a given period of time.

11. The method of claim 1 wherein the resource requirement is associated with one or more entries of the resource queue, the resource queue having a plurality of entries and a quantity of corresponding credits corresponding to a quantity of the plurality of entries.

12. The method of claim 1 wherein the resource tracker circuit has more than one resource table, each resource table grouping credits associated with at least one of a plurality of resource types.

13. The method of claim 1 wherein a quantity of the plurality of hardware credit unit storage elements associated with the at least one resource of interest is equal to a quantity of the at least one resource of interest.

14. The method of claim 1 wherein the at least one resource of interest has a shared resource quantity and is accessible via the resource queue having a plurality of entries, and the shared resource quantity is fewer than a quantity of the plurality of hardware credit unit storage elements which are associated with the at least one resource of interest.

15. A processor comprising a pre-execution pipeline, the pre-execution pipeline coupled to a resource of interest, the processor also comprising:
a queue for storing dispatched instruction data associated with the resource of interest,
a resource tracker circuit configured to associate a plurality of hardware credit unit storage elements with the resource of interest, and configured to receive signals to update values stored in the plurality of hardware credit unit storage elements when new instruction data is added to and the dispatched instruction data is removed from the queue,
a decoder circuit configured to identify a requirement, for the resource of interest, in the dispatched instruction data, and
a resource matcher circuit for, as a prerequisite for adding the new instruction data to the queue, comparing the requirement with a quantity of values stored in the hardware credit unit storage elements to perform a determination of when a number of available credits meets the requirement,
wherein the number of available credits exceeds a physical quantity of the resource of interest.

16. The processor of claim 15 further comprising a physical resource availability checker circuit for, as a prerequisite for allowing the dispatched instruction data to exit the queue, confirming availability of the resource of interest.

17. The processor of claim 15 wherein the resource of interest includes at least one temporary register of a temporary storage.

18. The processor of claim 15 wherein the resource matcher circuit has a combinational gate circuit to perform the determination, and the combinational gate circuit includes at least one redundant path for avoiding glitches in an output of the resource matcher circuit.

19. The processor of claim 15 further comprising a pulse generator electrically connected to a clock and to the resource matcher circuit and operable to prevent the resource matcher circuit from performing a subsequent determination for a given duration upon adding the new instruction data to the queue.

* * * * *